US010332036B2

(12) United States Patent
Zises (10) Patent No.: US 10,332,036 B2
(45) Date of Patent: Jun. 25, 2019

(54) USE OF TICKET FOR PURCHASING (71) Applicant: PAYPAL, INC., San Jose, CA (US)

(72) Inventor: Matthew Scott Zises, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 18 days.

(21) Appl. No.: 13/633,367

(22) Filed: Oct. 2, 2012

(65) Prior Publication Data

US 2014/0095219 A1 Apr. 3, 2014

(51) Int. Cl.
*G06Q 30/06* (2012.01)
*G06Q 10/02* (2012.01)

(52) U.S. Cl.
CPC ............ *G06Q 10/02* (2013.01); *G06Q 30/06* (2013.01)

(58) Field of Classification Search
CPC ...................................... G06Q 30/06
USPC ............ 705/39, 1.1, 26.1, 5, 67, 37; 463/42; 235/382, 384
See application file for complete search history.

(56) References Cited

U.S. PATENT DOCUMENTS

| 7,392,226 | B1* | 6/2008 | Sasaki | G06Q 20/045 705/64 |
| 2003/0069827 | A1 | 4/2003 | Gathman et al. | |
| 2007/0017976 | A1* | 1/2007 | Peyret | G06Q 20/10 235/380 |
| 2009/0099944 | A1 | 4/2009 | Robinson et al. | |
| 2009/0259515 | A1* | 10/2009 | Belimpasakis | G06Q 30/02 709/218 |
| 2009/0259560 | A1* | 10/2009 | Bachenheimer | 705/26 |
| 2010/0070312 | A1* | 3/2010 | Hunt | 705/5 |
| 2013/0332509 | A1* | 12/2013 | Schwartz et al. | 709/203 |
| 2015/0332227 | A1* | 11/2015 | Cosgray | G06Q 30/04 705/40 |

FOREIGN PATENT DOCUMENTS

WO WO 2010/096865 9/2010

\* cited by examiner

*Primary Examiner* — Akiba K Allen
(74) *Attorney, Agent, or Firm* — Haynes and Boone, LLP (57) ABSTRACT

Methods and systems are provided for facilitating payment for products purchased at events. More particularly, a ticket, rather than cash or credit cards, can be used to purchase products at events. For example, ticket holder can purchase food and drinks at a merchant's concession using the ticket or the ticket holder can purchase souvenirs at a gift shop associated with the event using the ticket. A bar code or the like can be scanned by the merchant and communicated to a payment provider to facilitate the transaction. The purchase can be made anonymously, such that information regarding the user cannot be obtained by merchant and/or sold for use by marketing companies.

20 Claims, 5 Drawing Sheets

USE OF TICKET FOR PURCHASING

BACKGROUND

Technical Field

The present disclosure generally relates to electronic commerce and, more particularly, relates to methods and systems for using a ticket, such as an event ticket, to purchase items, such as from concessions at the event.

Related Art

Tickets for events, such as movies, concerts, and sporting events, can be purchased online, over the telephone, or in person (such as from a brick and mortar ticket broker or at the event venue). For example, tickets for concerts and sporting events can be purchased from an online ticket seller, such as StubHub, Inc. The tickets can be paid for via a payment provider account, such as that offered by Paypal, Inc. After being paid for, the purchased tickets can then be mailed to the customer or picked up at will call. Sometimes the tickets can be printed on a home printer of the customer.

Ticket holders frequently purchase products at the events. A ticket holder may purchase food and drinks at a concession. For example, the ticket holder may purchase hot dogs and soft drinks at a Boston Red Sox baseball game. The ticket holder may purchase souvenirs at a gift shop of the venue. For example, the ticket holder may purchase Red Sox baseball caps, coffee mugs, and t-shirts at the baseball game. Generally, there are various different opportunities to purchase products at a venue for an event such as a concert or a sporting event.

The purchased products are commonly paid for with either cash or a credit card. However, some people prefer not to carry cash or credit cards at such events. Cash and credit cards can be lost or stolen. Further, the counting of cash payments and the processing of credit cards tends to slow down service at concessions, thereby discouraging or limiting sales at the concessions.

DETAILED DESCRIPTION

Sometimes it is inconvenient or undesirable for a person to carry cash or credit cards. For example, when attending an event such as a concert, a movie, or a sporting event, the person may fear losing these items or having them stolen. The person may simply prefer not to carry such items. Thus, it is beneficial to be able to make purchases at such events without having to use cash or credit cards.

Even when a credit card is carried by a person, the person may be reluctant to use the credit card for a purchase. Use of the credit card can provide the merchant with personal information that identifies the person to the merchant. The merchant can use the personal information for marketing purposes or can sell the information, along with information relating to the purchase (such as what products were purchased) to others for marketing purposes. The person can then receive unwanted advertisements, such as via regular mail, email, telephone, texting, and the like. Many people find such advertisements objectionable.

According to an embodiment, methods and systems are disclosed for facilitating payment for products purchased at events. More particularly, such methods and systems can facilitate the use of a ticket, rather than cash or credit cards, to purchase products at events. For example, the ticket holder or user can purchase food and drinks at a concession using the ticket. As a further example, the user can purchase souvenirs at a gift shop associated with the event.

According to an embodiment, the ticket can be a printed ticket that is used to indicate that a person is to be admitted to a predefined event. The ticket can be used to admit one person to one event. An event can be a happening that occurs at a specified time and place. For example, one ticket can admit one person to a specified baseball game at a specified time, date, and venue. Examples of events include movies, concerts, and sporting events (such as baseball games, football games, basketball games, and the like). The ticket can be for one time use at a one-time event.

By using the ticket, rather than a credit card, for such purposes, the merchant and others may be denied the personal information that identifies the user. Thus, information relating to the purchase cannot be used to send unwanted advertisements to the user. The ticket can function as a limited token to make purchases, as discussed herein. Other advantages include the user not having to use a payment card or cash to pay for purchases. In addition to identity issues, the user greatly reduces the risk of losing a payment card at the event due to putting the card in and taking the card out of a wallet or purse. The user does not have to carry a lot of cash or deal with carrying change. Also, the user greatly reduces the risk of losing cash, again from putting cash in and taking cash out of a pocket, wallet, or purse.

Tickets, whether purchased online, over the telephone, or in person (such as from a brick and mortar broker or at the event venue), typically have a bar code or the like printed thereon. The bar code can be used to uniquely identify the ticket.

Tickets can have different types of codes associated therewith. For example, tickets can have a quick response (QR) code printed thereon or can have a radio frequency identification (RFID) tag formed therewith. As used herein, the terms "code" and "bar code" can refer to a bar code, a QR code, an RFID tag, or any other means for uniquely identifying the ticket.

The ticket can have an invisible code printed thereon. The code can be an alpha-numeric code, for example. The code can be printed in an ink that is only visible under an ultraviolet lamp. Thus, a merchant, a clerk, a ticket taker, or the like can have an ultraviolet lamp and can check for the code. Some tickets can have the code and other tickets can omit the code. Since the code is invisible, the user can be unaware of the presence of the code and/or of the need for the code.

The online purchasing of tickets for various events is common. For example, tickets for movies, concerts, and sporting events can be purchased from an online ticket seller, such as StubHub, Inc. The tickets can be paid for via a payment provider account, such as that offered by Paypal, Inc. After being paid for, the purchased tickets can then be mailed to the customer or can sometimes be printed by the customer.

According to an embodiment, a system can comprise a memory for storing account information for a user. The account information can include information regarding a purchase of a ticket for an event by the user and information regarding features of the ticket. The system can further comprise one or more processors that are operable to receive a communication that includes an indication of a desire of the user to purchase a product from a merchant using the ticket. The processor(s) can access the account information of the user. The processor(s) can determine, at least in part, from the account information if the ticket is approved to be used to purchase the product. The processor(s) can authorize purchasing of the product using the ticket if the ticket is approved to purchase the product.

According to an embodiment, the ticket can lack information that identifies the user to the merchant. Thus, the user can make a purchase from the merchant anonymously. In this manner, the user can avoid providing the merchant with information that the merchant can use or sell to others for marketing purposes. The user can avoid receiving unwanted advertisements, such as via regular mail, email, telephone, texting, and the like. In another embodiment, user identity is included with the ticket information, such that the user may be offered customized or personalized incentives at the event.

According to an embodiment, the information regarding features of the ticket can include an identification of the ticket. For example, the information regarding features of the ticket can include information regarding a bar code of the ticket, a quick response (QR) code of the ticket, and/or a radio frequency identification (RFID) code of the ticket.

Information regarding features of the ticket can be stored in the user account. The bar code, the quick response (QR) code, and/or a radio frequency identification (RFID) code of the ticket can be used to identify the ticket to the server to facilitate determination of these features. This can be done, for example, to determine whether or not a particular purchase transaction is to be authorized.

According to an embodiment, limitations can be placed upon use of the ticket for purchasing. The information regarding features of the ticket can include such limitations on use of the ticket. When the ticket is used to make a purchase, the processor(s) can determine if the ticket is approved to be used to purchase the product and can determine if any limitations on use of the ticket will be exceeded or violated by the purchase. For example, the information regarding features of the ticket can include a purchasing money limit for the ticket and the processor(s) can determine if an amount of the purchase will cause the purchasing money limit for the ticket to be exceeded.

Suggestions regarding use of the ticket can be printed upon the ticket or upon associated material, e.g., a receipt for the ticket or instructions regarding use of the ticket. For example, if the ticket is given as a gift, the gift giver can suggest that the user eat at a particular restaurant of the venue. The suggested restaurant can accept payment for the meal via the ticket and provide incentives to the user if desired.

According to an embodiment, the processor(s) can select a funding source for the purchase that depends upon the product purchased. For example, food and beverage products can be paid for with the user's American Express card while all souvenirs can be paid for with the user's Visa card. The user can specify a funding source during the purchase of the product. For example, the funding source can be specified by entering a funding source code representative of the funding source, in the fashion that a personal identification number (PIN) is entered. The funding source can be entered as part of a PIN (such as by concatenating the funding source code with the PIN).

According to an embodiment, a method can comprise storing, in a memory, account information for a user. The account information can include information regarding a purchase of a ticket for an event by the user and information regarding features of the ticket. The method can further comprise receiving, electronically by one or more processors, a communication including an indication of a desire of the user to purchase a product from a merchant using the ticket. The processor(s) can access the account information of the user. The processor(s) can determine, at least in part, from the account information if the ticket is approved to be used to purchase the product. The processor(s) can authorize purchasing of the product using the ticket if the ticket is approved to purchase the product. The ticket can be approved to purchase the product if no limitation associated with the ticket is violated.

According to an embodiment, a computer program product can comprise a non-transitory computer readable medium having computer readable and executable code for instructing one or more processors to perform the method discussed herein. The method can include any of the features discussed herein.

The bar code, the quick response (QR) code, the radio frequency identification (RFID) code, or the like of the ticket can identify the ticket (with or without identifying the user) to the merchant and/or to a payment provider, so that the merchant can know whether or not the ticket is approved for use in a purchase. The bar code, the quick response (QR) code, the radio frequency identification (RFID) code, or the like can be communicated from the merchant to the payment provider and an indication as to whether or not the ticket is approved for use in the purchase can be communicated from the payment provider to the merchant.

Figure 1:
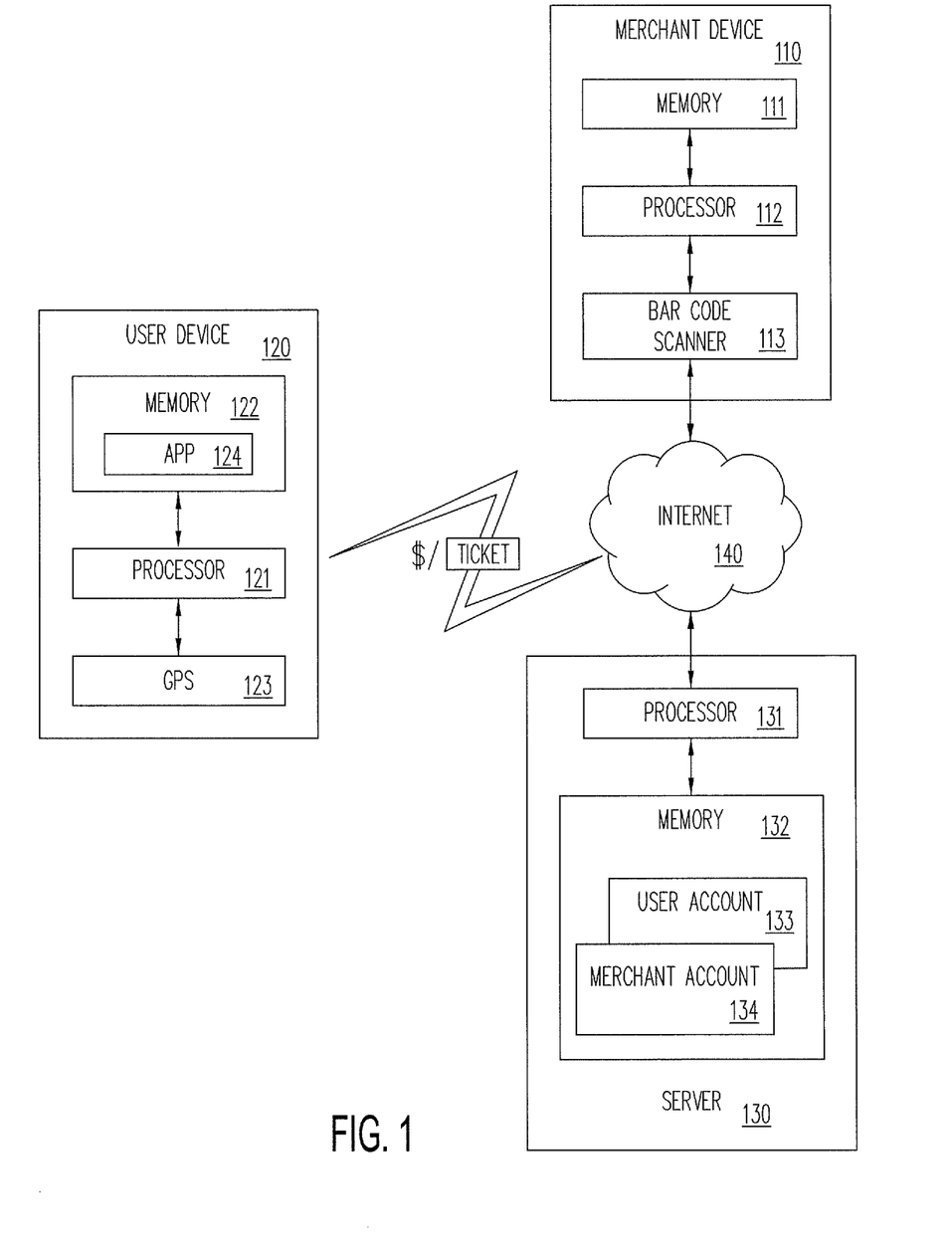
FIG. 1 is a block diagram of a system for facilitating the use of tickets for purchasing products at events, according to an embodiment.

FIG. 1 is a block diagram of a system for facilitating the use of tickets for purchasing products at events, in accordance with an embodiment. The system can include a merchant device 110. The merchant device 110 can comprise one or more merchant checkout terminals, computers, servers, networks, or network devices, for example. The merchant device 110 can include a memory 111, a processor 112, and a scanner 113. The scanner 113 can be a bar code scanner, for example. The scanner can be a QR code scanner, an RFID scanner, or any other type of scanner.

The system can comprise a plurality of merchant devices 110. For example, a venue such as a stadium can have one or more merchant devices 110 at each concession and souvenir shop. The merchant devices 110 can be used to facilitate use of the ticket for purchasing a product.

The system can include a user device 120. The user device 120 can be carried by the user. The user device 120 can be a cellular telephone, a smart telephone, a hand held computer, a laptop computer, a notebook computer, or a tablet computer, for example. The user device 120 can include a processor 121, a memory 122, and a global positioning system (GPS) 123. The memory can contain an app 124.

The system can include a server 130. The server 130 can be one or more servers of an online ticket seller such as StubHub, Inc., one or more servers of a payment provider such as Paypal, Inc., or can be any combination of servers of the online ticket seller and the payment provider. The server 130 can be one or more servers that cooperate to function as a combination online ticket seller and a payment provider.

The server 130 can include one or more processors 131 and a memory 132. The memory 132 can be a memory of the server 130 or a memory that is associated with the server 130. The memory 132 can be a distributed memory. The memory 132 can store a user account 133 and a merchant account 134.

The merchant device 110, the user device 120, and the server 130 can communicate with one another via a network, such as the Internet 140. The merchant device 110, the user device 120, and the server 130 can communicate with one another via a plurality of networks, such as local area networks (LANs), wide area networks (WANs), cellular telephone networks, and the like.

According to an embodiment, the merchant device 110 and the user device 120 can communicate with one another via a comparatively short range technology, such as WiFi, WiMax, Bluetooth, or infrared (IR). The scanner 113 of the merchant device can scan a screen of the user device 120. For example, the scanner 113 can scan a bar code that is displayed upon a screen of the user device 120.

FIG. 1 illustrates an exemplary embodiment of a network-based system for implementing one or more processes described herein. As shown, the network-based system may comprise or implement a plurality of servers and/or software components that operate to perform various methodologies in accordance with the described embodiments. Exemplary servers may include, for example, stand-alone and enterprise-class servers operating a server OS such as a MICROSOFT® OS, a UNIX® OS, a LINUX® OS, or another suitable server-based OS. It can be appreciated that the servers illustrated in FIG. 1 may be deployed in other ways and that the operations performed and/or the services provided by such servers may be combined or separated for a given implementation and may be performed by a greater number or fewer number of servers. One or more servers may be operated and/or maintained by the same or different entities.

Figure 2:
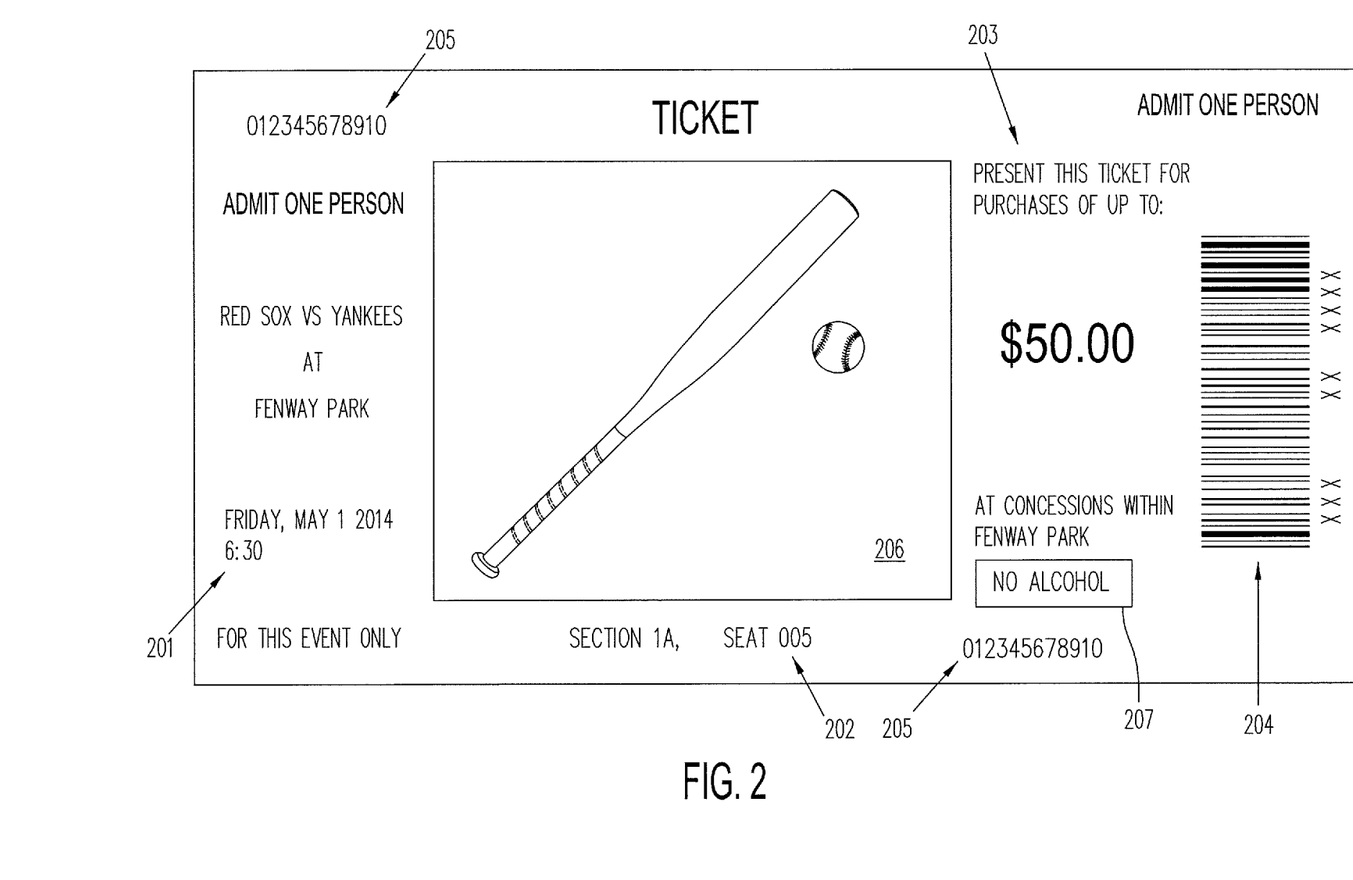
FIG. 2 shows a ticket with which products can be purchased at events, according to an embodiment.

FIG. 2 shows a ticket, according to an embodiment. The ticket can be a paper or paper-like ticket, a virtual ticket (such as a virtual ticket that can be displayed on the user device) or any other kind of ticket. The ticket can be made of any desired material and can have any desired content and format.

The ticket can be used to provide entry to the event. Purchasing power can be added to the ticket so that the ticket can be used to purchase products, such as at or around the event. The user can specify the amount of purchasing power to be added to the ticket. The purchasing power can be used to pay for parking, food and beverages, souvenirs, or anything else at the event or anywhere else at any other time, as discussed herein.

Purchasing power can be added to the ticket before, during, and/or after the event. Purchasing power can be added to the ticket when the ticket is initially purchased, at the venue (either during the event or at another time, such as during a different event), or at any other desired time. For example, after a baseball game when all of the purchasing power of the ticket has been exhausted, the user may decide to purchase a souvenir such as a game DVD. The user can add purchasing power to the ticket after the game in order to facilitate such a purchase.

Tickets can be sold bundled with purchasing power. Thus, tickets can be sold with a predetermined amount of purchasing power. The predetermined amount of purchasing power can be determined by the event promoter, the venue owner, the online ticket seller, the payment provider, the user, or any other entity. The amount of the purchasing power can be added to the purchase price of the ticket such that the user pays a single price for the ticket with bundled purchasing power.

The ticket can have event information 201 printed thereon. The event information 201 can provide an identification or description of the event, the time of the event, and the venue of the event. The ticket can have seating information 202 printed thereon. The seating information can indicate the section and seat number where the user is to sit during the event. The ticket can have purchasing power 203 printed thereon. The purchasing power 203 can indicate the maximum money amount for which the ticket can be used to make purchases, such as at the event. Purchasing power 203 may also be omitted for privacy and security reasons.

The purchasing power of the ticket can include a cash back feature. The purchasing power can be used to obtain cash from a merchant, bank, or an automated teller machine (ATM), for example. For example, the user can request cash back when making a purchase from a concession at an event venue. The amount of cash that can be obtained from the purchasing power of the ticket can be limited such that it is less than the purchasing power of the ticket. The cash back amount can be different from or independent with respect to the purchasing power. A limit on cash back can be printed on the ticket or omitted. The limit can be for the total cash that can be obtained with the ticket and/or can be for the amount of cash that can be obtained during a single transaction or time period.

According to an embodiment, the ticket can have any limitations 207 that apply to the ticket printed thereon or omitted. For example, the ticket can have the limitation "NO ALCOHOL" printed thereon, as shown in FIG. 2. The ticket can have the user's age printed thereon as an indication of limitations on use of the ticket. Rather than the user's age itself, the ticket can have some indication of the user's age printed thereon. For example, the ticket can have the word "MINOR" or "ADULT" printed thereon. As further examples, the ticket can have the words "18 or Over" or "Under 18" printed thereon.

The ticket can have a limitation printed thereon regarding who can use the ticket to make a purchase. For example, the ticket can have the words "For use by John Doe only" printed thereon. The user can be required to produce an ID, such as a picture ID, to show that the user is the person named on the ticket.

Only the name and picture of the ID need to be shown to the merchant. Any other information, such as the user's address, can be covered, such as with the user's hand, to prevent the merchant from seeing such information.

A ticket that lacks any limitations on the use thereof can be of one color or can have a background of a particular color and a ticket that has limitations (or that has a particular limitation) on the use thereof can be of another color or can have a background of the other color. For example, a ticket without limitations, such a ticket that permits the unrestricted purchase of alcohol and tobacco, can be blue or can have a blue background, such as in a graphic 206 printed on the front of the ticket, while a ticket with limitations on the purchase of alcohol and tobacco, can be red or can have a red background, such as in the graphic 206 thereof. The red ticket or the red background on the ticket can alert a seller that limitations apply to the ticket. The system can be configured such that even if the seller is unaware of the limitations, the ticket cannot be used in violation of the limitation. For example, the ticket can be checked by the merchant device 110 or the server 130 for limitations after being scanned and the transaction can be denied if any limitations are violated.

Note that in other embodiments, the ticket may not have any visual indicators different than a conventional ticket, which may be desirable for security and privacy concerns. For example, one or more (including all) limitations, restrictions, user information, or the like may be encoded in a machine readable code or chip, but not readily visible or determinable by a human.

A code, such as bar code 204, can be printed or otherwise formed upon the ticket. The code can be a bar code, a quick response (QR) code, or any other type of code. The ticket can comprise a radio frequency identification (RFID) device. Any combination of such codes and devices can be used. The use of multiple codes and/or devices can enhance the utility of the ticket by facilitating the ticket's use with a larger number of merchants.

Any limitations on the use of the ticket can be associated with the code, such that an attempt to purchase a restricted item with the ticket can be recognized when the bar code is scanned. Thus, the system can disallow any attempt to purchase the restricted item with the ticket.

The ticket can have a serial number 205 printed thereon. The bar code 204 can include the serial number, can include a second serial number, or can take the place of the serial number 205. The bar code 204 can include information indicative of any limitations. The bar code 204 can identify an entry in a database where limitations on use of the ticket to make purchases are listed.

According to an embodiment, the ticket lacks any information that the merchant can use to identify the user. The ticket can lack any information that anyone other than the payment provider and/or the ticket seller can use to identify the user. Generally, the payment provider and/or the ticket seller will be able to identify the ticket holder from the bar code, QR code, RFID, or other code or serial number of the ticket to facilitate billing of purchases made using the ticket to the correct user account 133.

According to an embodiment, both the ticket and/or the purchasing power associated with the ticket can be purchased with a credit card and no record that associates the user with the particular ticket can be made. Thus, the serial number and/or bar code of the ticket can be unrecorded while the standard purchase transaction information (such as the name of the purchaser, the date of the purchase, the name of the merchant, the merchant ID, the amount of the purchase, and the product purchased) associated with the purchase of the ticket can be recorded.

According to an embodiment, an ad hoc or dummy user account 133 can be set up when a ticket with purchasing power is bought by the user. The dummy user account 133 can be funded by the user, such as via a credit card. Information regarding the funding source for the dummy user account 133 can be maintained with a higher level of security (requiring a higher level of approval within the organization of the payment provider for disclosure or use). Information regarding the funding source for the dummy user account 133 can be unrecorded, such that there is no record regarding from where the money in the dummy user account came. Thus, when purchases are made using the ticket, the dummy account can be debited and there is no record connecting the user to the purchase.

According to an embodiment, both the ticket and the purchasing power associated with the ticket can be purchased with cash. No credit cards or other means of identifying the user need to be used. For example, the ticket can be purchased with cash at the venue and further cash (above the ticket price) can be used to add purchasing power to the ticket. In this manner, both the ticket and the purchasing power can be purchased by the user such that the ticket can be untraceable to the user. Thus, the user can make purchases at the venue completely anonymously, e.g., without the merchant, the payment provider, or the ticket seller being able to associate the purchases with the user.

According to an embodiment, the purchasing power of the ticket can be augmented or replenished. For example, additional purchasing power, above the purchasing power previously bought, can be added to the ticket prior to the event and prior to any use of the ticket to make purchases. Additional purchasing power can added to the ticket after the ticket has been used to make one or more purchases. For example, when the purchasing power of the ticket is almost depleted, the user can buy additional purchasing power at the event. Additional purchasing power can be bought online, such as via the user device 120, which can communicate with the server 130 to facilitate the purchase. Additional purchasing power can be bought at the venue, such as by using cash or a credit card in a person-to-person transaction at the ticket window, at a concession, at a kiosk, or at an ATM. ATM's at any location can be configured to facilitate the purchase of tickets and/or purchasing power, including additional purchasing power.

According to an embodiment, safeguards can be required, such as for use of the ticket to purchase products above a predetermined limit, e.g., expensive items. One example of such a safeguard can be requiring the user to show a photo identification (ID) when making a purchase. Another example of such a safeguard is that the user can be required to show and/or scan a credit card. Such safeguards can be required for purchases of any amount (such as for all purchases made by the user).

One or more attributes of the user can be printed on the ticket to inhibit misuse thereof. For example, a description of the user that includes sex, age, height, weight, eye color, and/or hair color can be printed on the ticket to help the merchant determine that the person presenting the ticket for the payment of a purchase is a legitimate user of the ticket. The user's name, social security number, driver's license number, or any other information that can be used to determine the identity of the user can be omitted, i.e., not printed upon the ticket.

A picture can be printed on the ticket to inhibit misuse thereof. Neither the attributes nor the picture disclose the identity of the user to the merchant. Thus, even when the attributes and/or the picture are used, the user can still make the purchase anonymously.

Figure 3:
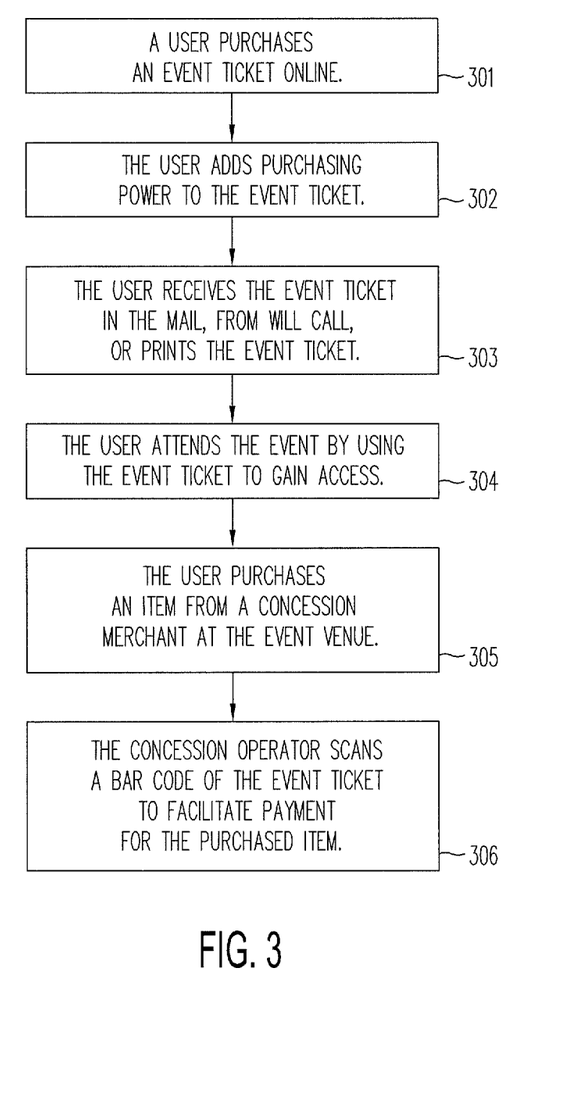
FIG. 3 is a flow chart showing a method for facilitating the use of tickets for purchasing products at events, according to an embodiment.
Figure 4:
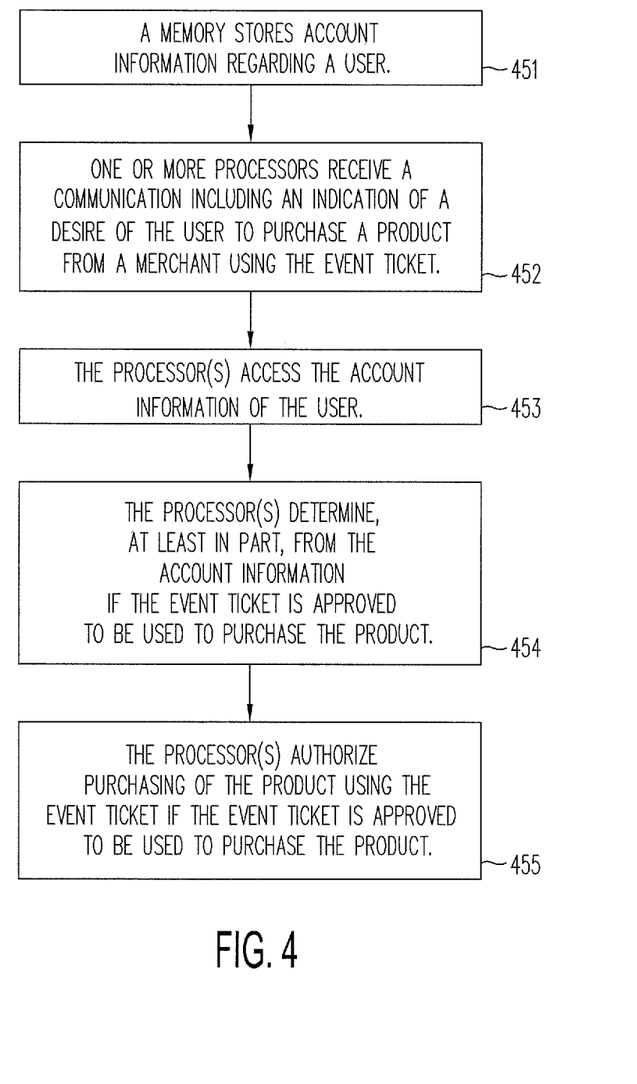
FIG. 4 is a flow chart showing further detail of the method for facilitating the use of tickets for purchasing products at events, according to an embodiment.

FIGS. 3 and 4 are flow charts that describe examples of operation of the system for facilitating the use of tickets for purchasing products at events according to embodiments thereof. Note that one or more of the steps described herein may be combined, omitted, or performed in a different order, as desired or appropriate.

The ticket can be for a one-time event limited to a location and day/time of the event, where the ticket is also used for event admission. Thus, the ticket can be for use in admission to a single event at a single location that takes place on a specified day at a specified time. The ticket can be used both for admission to the event and for making purchases at the event.

FIG. 3 is a flow chart showing a method for facilitating the use of tickets for purchasing products at events, according to an embodiment. More particularly, various steps of an example of use of the embodiment according to a user's point of view are shown and discussed in detail.

A user can purchase a ticket, as shown in step 301. The user can purchase the ticket online, at a brick and mortar store, or in any other manner. The user can purchase the ticket from the venue, a ticket broker, an online ticket seller, or any other entity.

The user can add purchasing power, to the ticket, as shown in step 302. The purchasing power can be added to the ticket online, at a kiosk (such as at the venue), at a brick and mortar store, via an ATM, or in any other manner.

The price paid by the user for the purchasing power can be discounted with respect to actual purchasing power of the ticket. For example, the user can pay $90 for $100 of purchasing power. The use of purchasing power can be restricted to predefined merchants. In this manner, the user can be given a predefined discount for shopping with these predefined merchants.

The purchasing power can be added to the ticket when purchasing the ticket or after the ticket has been purchased. For example, the user can add the purchasing power to the ticket during a separate online session with the online ticket seller several days after the ticket was purchased.

Any limitations regarding the use of the ticket can be added to the ticket when purchasing the ticket or after the ticket has been purchased. For example, the user can scan or otherwise identify the ticket at home and set up limits and categories regarding what the ticket can be used to purchase, such as via a web site of the online ticket seller or via a website of the payment provider. Further, the user can vary funding sources based upon what is being purchased. For example, food and beverages can be paid for with the user's American Express credit card while all other purchases are paid for via Visa or Automated Clearing House (ACH). The user and/or the payment provider may require a photo ID or other identifier when making any or certain purchases, or the user and/or the payment provider may allow the ticket to be used by itself, similar to cash, without the need for any secondary identification or authentication.

The user can be provided with a code, such as a password or personal identification number (PIN). For example, the user can be provided with a PIN when the user adds purchasing power to the ticket. The PIN can be required by the merchant, ticket seller, or payment provider in order to authorize a purchase made using the purchasing power of the ticket. For example, the user can be required to enter the PIN into the merchant device to obtain authorization for the purchase. The PIN can be required by some merchants and not by other merchants. The PIN can be required only for purchases that are above a predetermined money amount. The predetermined money amount can be determined by the merchant, payment provider, and/or ticket seller. The predetermined money amount can vary from one merchant to another.

According to an embodiment, the money amount for which the PIN is required when making a purchase can vary dynamically. The server 130 can use a plurality of different factors to determine whether or not the PIN is required. For example, the server 130 can use the geographic area, day of the week, time of day, type of store, and particular product being purchase to determine whether or not the PIN is required. Thus, the purchasing of alcohol in a high crime area at midnight may require that the user provide the PIN, while the purchase of cupcakes in a low crime area at noon on Sunday may not require that the user provide the PIN. The PIN can be required on a random basis.

The server 130 can apply weighting factors to such information such that some items contribute more to the decision regarding whether or not the PIN is required for a purchase than other items. For example, the geographic area and the product being purchased can be weighted more heavily that other items. Thus, the purchasing of alcohol in a high crime area may require that the user provide the PIN regardless of the other factors, while the purchase of cupcakes in a low crime area may not require that the user provide the PIN regardless of the other factors.

The user can be requested to provide information (such as the user's birthdate or the user's first name) when the user purchases the ticket, buys purchasing power for the ticket, adds additional purchasing power to the ticket and/or makes a purchase. The information can be required by the merchant, ticket seller, or payment provider in order to authorize a purchase made using the purchasing power of the ticket. For example, the user can be required to enter the information into the merchant device 110 to obtain authorization for the purchase.

The user can receive the ticket in the mail, from will call, or prints the ticket, as shown in step 303. Some tickets, such as those having sophisticated anti-counterfeiting features, must be mailed to the user. For example, tickets having an RFID are typically mailed to the user. Some tickets can be printed by the user, such as with a home or business printer, e.g., a laser printer.

The user can attend the event by using the ticket to gain access, as shown in step 304. The ticket can be presented at the gate to identify the user as a person who is authorized to attend the event. A portion of the ticket can be removed and kept by the gate attendant. The ticket can be scanned, such as by the user and/or the gate attendant.

The user can purchase a product from a concession at the event venue, as shown in step 305. The user can present the ticket to a concession operator upon making a purchase. The ticket can be used to make multiple purchases, e.g., separate purchases at the same concession or at different concessions and shops of the venue or elsewhere.

The merchant can offer a discount to customers who use the purchasing power of a ticket to make purchases with the merchant. The purchasing power of the ticket can be verified locally, such as by the merchant device 110. Thus, the purchase can be authorized locally, e.g., at the venue. Authorizing the process locally can speed up the purchase process, thereby allowing the merchant to service more customers in a given amount of time. Servicing more customers in a given amount of time can reduce the length of lines at concessions, thereby encouraging use of the concessions and potentially increasing sales.

According to an embodiment, the user can purchase products at the venue or away from the venue. The user can purchase a product from a merchant that is associated with the event or the venue. For example, prior to the event, the user can purchase products from a merchant that sponsors the event or the venue. The purchasing power of the ticket can be used to make purchases from sponsors of the event or the venue or from other merchants related to the event, the venue, the online ticket seller, or the payment provider.

The user can purchase a product from a merchant that is not associated with the venue. Before or after the event, the user can purchase products that are not related to the event. For example, after the event the user can purchase a meal at a fast food restaurant, can purchase gas at a gas station, and can purchase a dress shirt at a clothing store. The user can purchase products from any merchant who accepts the purchasing power of the ticket as payment. Merchants not related to the venue can be associated with the online ticket seller and/or the payment provider to facilitate such purchases. Thus, according to an embodiment, the user can purchase products from any merchant at any location.

The concession operator can scan a bar code of the ticket to facilitate payment for the purchased item, as shown in step 306. For example, the bar code 204 of the ticket can be scanned using the merchant device 110. By scanning the bar code 204 of the ticket the merchant device 110 can cooperate with the server 130 to effect payment for the purchase via the ticket. More particularly, the merchant device 110 can communicate the bar code 204 to the server 130 and the server 130 can debit the user account 133 for the purchase. The server 130 can match the ticket to the user account 133 via the bar code 204.

After the ticket is scanned, information regarding the ticket can be communicated from the merchant device 110 to the server 130. The server 130 can verify that the ticket is valid and that the purchase does not exceed any remaining purchasing power of the ticket (and any other restrictions associated with the ticket). Examples of restrictions include use only with a certain geographical location and date/time of the event. If the purchase exceeds the remaining purchasing power of the ticket, then the user can be asked by the merchant to pay the difference, such as with cash or a credit card.

The concession operator can provide the user with a receipt that shows the remaining purchasing power of the ticket after the purchase. The receipt can be a paper receipt. The paper receipt can include the money amount of the purchase and any money amount remaining on the ticket. The paper receipt can include coupons or promotional material. In this manner, the user can be readily apprised of the money amount that is available further purchases that can be made using the ticket.

The remaining purchasing power can be printed on the ticket. For example, the merchant device 110 can comprise a printer for printing the remaining purchasing power on the back of the ticket. The merchant device 110 can comprise a bar code scanner 113 having a built-in or integral printer that prints the remaining amount on the ticket, approximately at the same time that the ticket is scanned. The ticket can comprise an electronic device that displays the remaining amount. A virtual ticket, such as a virtual ticket stored by the user device 120, can display the remaining amount on a screen of the user device 120.

The receipt can be an electronic receipt. For example, the receipt can be communicated to the user device 120, such as via WiFi, or Bluetooth. Thus, the ticket can be a virtual ticket and the receipt can be a virtual receipt, such that the use of paper products associated with the ticket is substantially mitigated.

According to an embodiment, the app 124 of the user device can manage one or more virtual tickets, as well as purchasing with the virtual tickets. The app 124 can maintain a record of purchases made with each ticket and can provide the remaining purchasing power of each ticket.

According to an embodiment, the virtual ticket can be shared among a plurality of user devices. The app 124 can cooperate with an app 124 of another user device 120 such that either of the user devices 120 can be used to present the virtual ticket for entry to the venue and such that either of the user devices 120 can be used to make purchases with the ticket. That is, the virtual ticket and the purchasing power of the virtual ticket can be available for use on a plurality of different mobile devices. Such sharing can be facilitated using the app 124 or can be done online via the ticket seller.

When the virtual ticket is shared, real time management of the virtual ticket can be done to prevent misuse of the virtual ticket and the purchasing power associated therewith. Such real time management can invalidate the ticket for further entry into the venue after it has been used once therefore and can update the purchasing power of the ticket as purchases are made using different user devices 120. For example, such real time management of the ticket can be done by the merchant device 110, the server 130, and/or on a peer-to-peer basis among the user devices 120.

According to an embodiment, the virtual ticket can be transferred, serially, from one user device 120 to another user device 120 by the user. In this manner, only one user device at a time has the virtual ticket and the purchasing power associated therewith. Such serial transfer can be facilitated using the app 124 or can be done online via the ticket seller.

According to an embodiment, the virtual ticket can be restricted to use with a particular user device 120. That is the ticket cannot be shared among user devices 120 and cannot be transferred to another user. Once the virtual ticket is on a particular user device 120, the virtual ticket must be used on that particular user device 120. If the user device is broken, lost, stolen, or otherwise cannot be used, then a new or replacement virtual ticket must be obtained, such as from the online ticket seller.

Thus, the virtual ticket can be shared or used on different devices and/or by different people (such as friends and family members). For example, the virtual ticket can be shared between the user and a date, the user and selected family members, among a group of users, and/or among any other desired people. Different limits (spending limits and/or other limits) can be associated with each different person or device. For example, the user's child can have a much lower spending limit than the user and can have a specific limit on the amount of candy and soft drinks that can be purchased.

The user can pay for the purchase solely with the ticket, with cash, with a credit card, or with any combination of the ticket, cash, and the credit card. Thus, the ticket can be used instead of cash or the credit card for the purchase. Since the ticket does not contain any information that identifies the ticket to the merchant, the user can make the purchase anonymously with respect to the merchant. The merchant device 110, with or without the cooperation of the server 130, can monitor use of the ticket for purchases. That is, the merchant device 110 can maintain a running total of the purchasing power of the ticket so as to assure that the ticket is not used to make a purchase when the ticket has insufficient purchasing power for the purchase.

FIG. 4 is a flow chart showing further detail of the method for facilitating the use of tickets for purchasing products at events, according to an embodiment. More particularly, various steps of the embodiment that are associated with operation of the server 130 are shown and discussed in detail.

A memory can store account information regarding a user, as shown in step 451. For example, the memory can be a memory of an online ticket seller, a payment provider, or the like. The memory can store information regarding the user such as identification information, account balance information, and credit information.

One or more processors can receive a communication including an indication of a desire of the user to purchase a product from a merchant using the ticket, as shown in step 452. For example, the user can be in the process of purchasing food and beverages from a concession at an event venue, as discussed herein.

The processor(s) can access the account information of the user, as shown in step 453. The processor(s) can access the account information of the user in response to receiving the communication of step 452.

The processor(s) can determine, at least in part, from the account information if the ticket is approved to be used to purchase the product, as shown in step 454. More particularly, the processor(s) can determine if the ticket has sufficient remaining purchasing power to make the desired purchase and any and all restrictions or limitations are met.

The processor(s) can authorize purchasing of the product using the ticket if the ticket is approved to be used to purchase the product, as shown in step 455. If the ticket has sufficient remaining purchasing power to make the desired purchase and any and all restrictions or limitations are met, then the processor(s) can authorize the purchase. Otherwise, the processor(s) can deny the purchase.

If the ticket lacks sufficient purchasing power to make the desired purchase, then the user can be informed so that the user can be instructed regarding how to add more purchasing power. For example, the user can be directed to a kiosk or ATM at the venue where more purchasing power can be added to the ticket. If a limitation is not met, the user may be asked to approve the purchase through authentication with the payment provider, such as entering in a PIN or password associated with the user's account with the payment provider.

The memory can be a memory 132 of a payment server and/or an online ticket seller server 130. The account information can include information regarding a purchase of a ticket by the user and information regarding features of the ticket.

As a more specific example of the use of purchasing power of a ticket, a user can purchase a ticket for a Boston Red Sox baseball game from an online ticket seller, such as StubHub, Inc. The user can purchase the ticket from the online ticket seller with a credit card.

At the time of purchase, the online ticket seller can ask the user, such as via a pop-up ad on a web page, if the user would like to add purchasing power to the ticket. If the user response affirmatively, then the user can be presented with a form having an entry blank into which the user can enter an amount of purchasing power desired. Proximate the entry blank can be the question "How much purchasing power would you like to add?"

The user can specify the amount of purchasing power to be added to the ticket either by typing the amount into the blank or by selecting an amount from a drop down menu. For this example, let's assume that the user purchases $50 of purchasing power for the ticket.

The user can buy the purchasing power with the same credit card that was used to purchase the ticket. The ticket and the purchasing power can be bought in the same credit card transaction or in two separate credit card transactions. A different credit card can be used to buy the purchasing power with respect to the credit card that was used to buy the ticket.

A ticket, similar to the ticket shown in FIG. 2, can be mailed to the user. The ticket can show the purchasing power 203 as $50. This can be the maximum or total amount of money that the ticket can be used with which to make purchases.

At the baseball game, the user can purchase food and beverages from a concession of the venue using the ticket. During the purchase, the ticket can be swiped by the concession operator and the user can be provided with a receipt that shows the money amount of the purchase and the money amount remaining on the ticket, i.e., the amount of further purchases that can be made with the ticket.

Later, the user can allow someone else, e.g., a family member or friend of the user, to use the same ticket to purchase a souvenir t-shirt from a souvenir shop of the game venue. Generally, the ticket can be used by anyone, as long as the use of the ticket does not violate a limitation of the ticket. An exception would be when the user applied a limitation regarding who can use the ticket. Another exception would be when the merchant, the payment provider, or the ticket seller applied such a limitation (such as when the user must personally present a photo ID for the purchase of an expensive product).

Any money amount remaining on the ticket can be refunded to the user. For example, the remaining amount can be credited to the credit card with which the user bought the purchasing power. As a further example, the remaining amount can be refunded in cash to the user by a merchant at the game venue.

As yet a further example, the remaining amount can be applied to the purchase of another ticket and/or purchasing power in the future. The user can be required to use the same payment provider or online ticket seller in order to apply the remaining amount to such a future purchase. In this manner, user loyalty can be encouraged.

As yet a further example, the remaining amount can be donated by the user to a charity. The user can select the charity. For example, the user can authorize the donation and select the charity when the user buys the purchasing power such as online. The user can authorize the donation and select the charity during a subsequent (such as after the baseball game) online session with the ticket seller.

According to an embodiment, the user can determine what is to be done with any remaining amount of the purchasing power at any time. The user can do this when the user buys the purchasing power or after a portion of the purchasing power has been used. After the user has used a portion of the purchasing power, the user may wish to convert the remaining purchasing power into cash.

As another specific example of the use of purchasing power of a ticket, a user can purchase a ticket for a movie at a theater. When purchasing the ticket, the user can add purchasing power to the ticket by paying for the purchasing power at the ticket window. The purchasing power can be used to purchase food and beverages at the concession within the theater. By using the purchasing power of the ticket to purchase food and beverages at the concession, the user avoids the inconvenience of having to pay twice with cash or a credit card (once for the ticket and again for the food and beverage).

Offers and/or discounts regarding tickets and purchasing power can be provided at the ticket window. For example, a bundled ticket with a predetermined amount of purchasing power can be offered for a stated price. For example, the regular price of the ticket can be $10, the regular price of a large popcorn can be $6 and the regular price of a large soft drink can be $4. The ticket, the large popcorn, and the large soft drink can be bundled together and offered for $16 by selling the ticket with purchasing power to buy the large popcorn and the large soft drink for a total of $16. The theater can benefit from increased concession sells and decrease customers waiting time at the concession counter since the concession worker merely needs to swipe the ticket rather than accept payment by cash or credit card.

In implementation of the various embodiments, embodiments of the invention may comprise a personal computing device, such as a personal computer, laptop, PDA, cellular phone or other personal computing or communication devices. The payment provider system may comprise a network computing device, such as a server or a plurality of servers, computers, or processors, combined to define a computer system or network to provide the payment services provided by a payment provider system.

In this regard, a computer system may include a bus or other communication mechanism for communicating information, which interconnects subsystems and components, such as a processing component (e.g., processor, microcontroller, digital signal processor (DSP), etc.), a system memory component (e.g., RAM), a static storage component (e.g., ROM), a disk drive component (e.g., magnetic or optical), a network interface component (e.g., modem or Ethernet card), a display component (e.g., CRT or LCD), an input component (e.g., keyboard or keypad), and/or cursor control component (e.g., mouse or trackball). In one embodiment, a disk drive component may comprise a database having one or more disk drive components.

The computer system may perform specific operations by processor and executing one or more sequences of one or more instructions contained in a system memory component. Such instructions may be read into the system memory component from another computer readable medium, such as static storage component or disk drive component. In other embodiments, hard-wired circuitry may be used in place of or in combination with software instructions to implement the invention.

Figure 5:
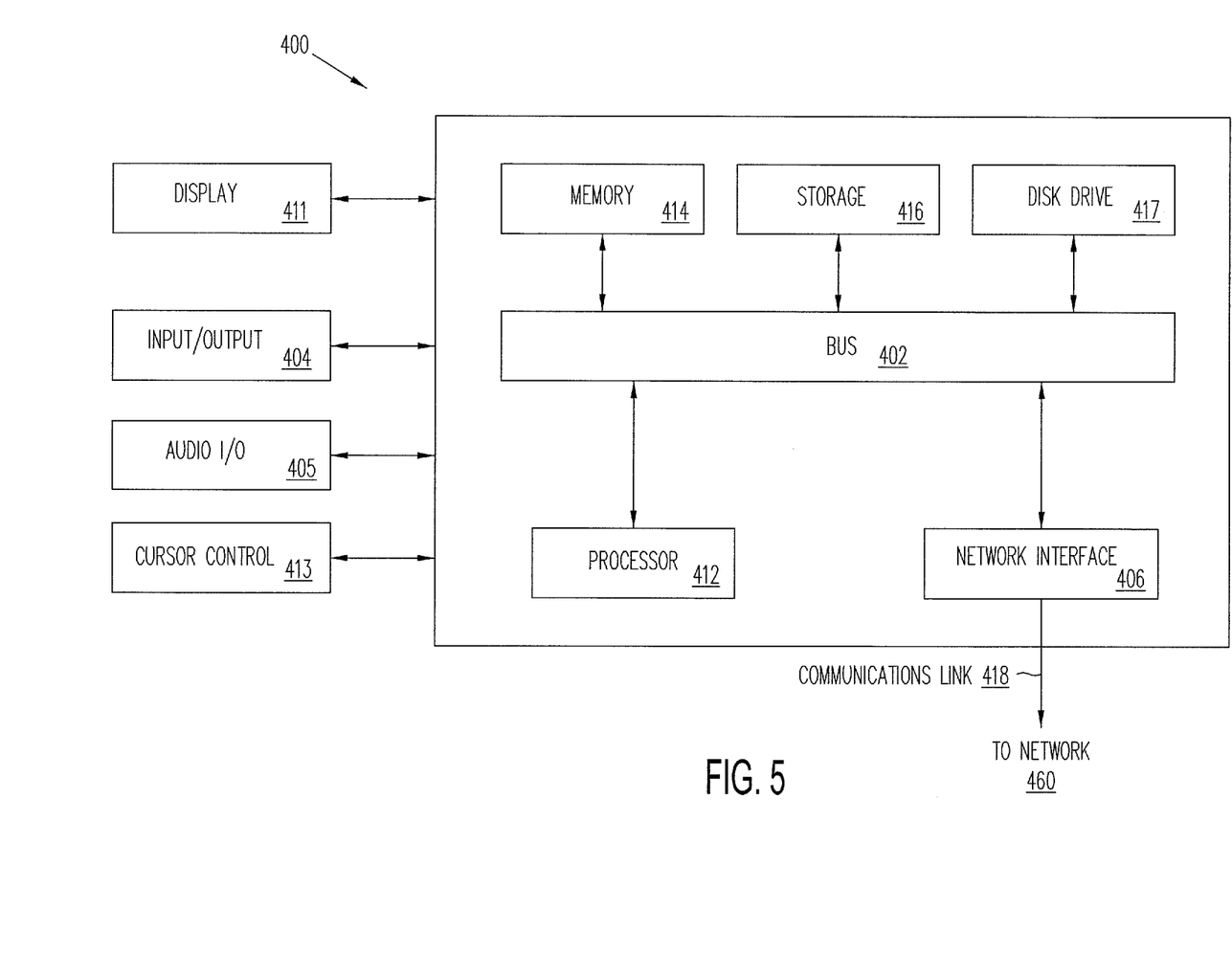
FIG. 5 is a block diagram of an example of a computer that is suitable for use in the system for facilitating the use of tickets for purchasing products at events, according to an embodiment.

FIG. 5 is a block diagram of a computer system 400 suitable for implementing one or more embodiments of the present disclosure. In various implementations, the PIN pad and/or merchant terminal may comprise a computing device (e.g., a personal computer, laptop, smart phone, tablet, PDA, Bluetooth device, etc.) capable of communicating with the network. The merchant and/or payment provider may utilize a network computing device (e.g., a network server) capable of communicating with the network. It should be appreciated that each of the devices utilized by users, merchants, and payment providers may be implemented as computer system 400 in a manner as follows.

Computer system 400 includes a bus 402 or other communication mechanism for communicating information data, signals, and information between various components of computer system 400. Components include an input/output (I/O) component 404 that processes a user action, such as selecting keys from a keypad/keyboard, selecting one or more buttons or links, etc., and sends a corresponding signal to bus 402. I/O component 404 may also include an output component, such as a display 411 and a cursor control 413 (such as a keyboard, keypad, mouse, etc.). An optional audio input/output component 405 may also be included to allow a user to use voice for inputting information by converting audio signals. Audio I/O component 405 may allow the user to hear audio. A transceiver or network interface 406 transmits and receives signals between computer system 400 and other devices, such as a user device, a merchant server, or a payment provider server via network 460. In one embodiment, the transmission is wireless, although other transmission mediums and methods may also be suitable. A processor 412, which can be a micro-controller, digital signal processor (DSP), or other processing component, processes these various signals, such as for display on computer system 400 or transmission to other devices via a communication link 418. Processor 412 may also control transmission of information, such as cookies or IP addresses, to other devices.

Components of computer system 400 also include a system memory component 414 (e.g., RAM), a static storage component 416 (e.g., ROM), and/or a disk drive 417. Computer system 400 performs specific operations by processor 412 and other components by executing one or more sequences of instructions contained in system memory component 414. Logic may be encoded in a computer readable medium, which may refer to any medium that participates in providing instructions to processor 412 for execution. Such a medium may take many forms, including but not limited to, non-volatile media, volatile media, and transmission media. In various implementations, non-volatile media includes optical or magnetic disks, volatile media includes dynamic memory, such as system memory component 414, and transmission media includes coaxial cables, copper wire, and fiber optics, including wires that comprise bus 402. In one embodiment, the logic is encoded in non-transitory computer readable medium. In one example, transmission media may take the form of acoustic or light waves, such as those generated during radio wave, optical, and infrared data communications.

Some common forms of computer readable and executable media include, for example, floppy disk, flexible disk, hard disk, magnetic tape, any other magnetic medium, CD-ROM, any other optical medium, punch cards, paper tape, any other physical medium with patterns of holes, RAM, ROM, E2PROM, FLASH-EPROM, any other memory chip or cartridge, carrier wave, or any other medium from which a computer is adapted to read.

In various embodiments, execution of instruction sequences for practicing the invention may be performed by a computer system. In various other embodiments, a plurality of computer systems coupled by a communication link (e.g., LAN, WLAN, PTSN, or various other wired or wireless networks) may perform instruction sequences to practice the invention in coordination with one another.

Modules described herein can be embodied in one or more computer readable media or be in communication with one or more processors to execute or process the steps described herein.

A computer system may transmit and receive messages, data, information and instructions, including one or more programs (i.e., application code) through a communication link and a communication interface. Received program code may be executed by a processor as received and/or stored in a disk drive component or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa—for example, a virtual Secure Element (vSE) implementation or a logical hardware implementation.

Software, in accordance with the present disclosure, such as program code and/or data, may be stored on one or more computer readable and executable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

As used herein, the term "ticket" can include a printed ticket, a virtual ticket (such as a ticket displayed on a screen of a mobile device), or any other thing that can be used to indicate that a person is to be admitted to a predefined event. The ticket can be printed on paper, paperboard, cardstock, plastic, or any other suitable material. Typically, one ticket is sold to admit one person to one event. For example, one ticket can admit one person to a specified baseball game at a specified time, date, and venue. A ticket can be for one time admittance to a one-time event. The event can be limited to one particular location, one particular time, and one particular date.

As used herein, the term "event" can include any gathering of people for which tickets are required and where products are sold. Typically, one ticket is sold to admit one person to one event. Examples of events can include concerts, sporting events (such as baseball games, football games, basketball games, soccer matches, tennis matches, boxing matches, and the like), movies, plays, circuses, fairs, carnivals, and the like. An event can be a one-time happening or occurrence.

As used herein, the terms "code" and "bar code" can refer to any bar code, QR code, RFID, or any other code, serial number, identification, or identifying indicia of the ticket.

As used herein, the term "user" can include the purchaser of the ticket, as well as the person who makes a purchase with the ticket. The purchaser of the ticket and the person who makes a purchase with the ticket can be the same person or can be two different people. The term "user" can refer to either a single person or a plurality of people.

As used herein, the term "store", "shop", and "concession" can include any business or place of business. The store can be a brick and mortar store or an online store. The store can be any person or entity that sells a product.

As used herein, the term "product" can include any item or service. Thus, the term "product" can refer to physical products, digital goods, services, or anything for which a user can make a payment, including charitable donations. A product can be anything that can be sold.

As used herein, the term "merchant" can include any seller of products. The term merchant can include a store. The products can be sold from a store or in any other manner.

As used herein, the term "mobile device" can include any portable electronic device that can facilitate data communications, such as via a cellular network and/or the Internet. Examples of mobile devices include cellular telephones, smart phones, tablet computers, and laptop computers.

Embodiments disclose a simple and easy way to avoid undesirably giving away personal information. Additionally, the need to carry money at an event can be substantially mitigated or eliminated.

The foregoing disclosure is not intended to limit the present invention to the precise forms or particular fields of use disclosed. It is contemplated that various alternate embodiments and/or modifications to the present invention, whether explicitly described or implied herein, are possible in light of the disclosure. Having thus described various example embodiments of the disclosure, persons of ordinary skill in the art will recognize that changes may be made in form and detail without departing from the scope of the invention. Thus, the invention is limited only by the claims.

What is claimed is:

1. A system comprising:
a non-transitory memory; and
one or more hardware processors coupled to the non-transitory memory and configured to read instructions from the non-transitory memory to cause the system to perform operations comprising:
receiving, through a network from a first user device via a first virtual ticket application, a first request from a user to add purchasing power to a ticket associated with a user account that was purchased for admittance to an event by the user;
creating an ad hoc account that provides funds to the ticket and that is funded by the user account;
adding the purchasing power requested in the first request to the ad hoc account from the user account that identifies the user of the user account without recording information regarding the user account with the ad hoc account;
electronically providing, through the network for display on the first user device via the first virtual ticket application, the ticket having the purchasing power, wherein the ticket is configurable on a display of the first user device to display purchase request information that includes the purchasing power and that, in response to an electronic scan by a merchant device of a merchant, causes a second request from the user to purchase a product to be communicated to the system;
determining, based on the electronic scan of the purchase request information, whether the purchasing power of the ticket is sufficient to purchase the product using the ticket;
authorizing, based on the electronic scan of the purchase request information, purchasing of the product using the ticket if the purchasing power is sufficient, wherein the electronically scanned purchase request information and the ad hoc account lack information that identifies the user of the ticket and the user account to the merchant and causes the merchant device to authorize purchasing of the product using the ticket without receiving any information that identifies the user and the user account;
receiving a third request to transfer the ticket from the first virtual ticket application on the first user device to a second virtual ticket application on a second user device; and
electronically providing, through the network for display on the second user device via the second virtual ticket application, the ticket having the purchasing power.

2. The system of claim 1, wherein the purchase request information comprises information regarding features of the ticket that include an identification of the ticket, and wherein the ticket comprises a paper ticket.

3. The system of claim 1, wherein adding the purchasing power requested in the first request to the ticket that is associated with the user account comprises receiving a first amount of funds from the user and adding a second amount of funds to the ticket, wherein the second amount is greater than the first amount, and wherein the purchase request information includes information regarding at least one item selected from a list consisting of:
a bar code of the ticket;
a quick response (QR) code of the ticket; and
a radio frequency identification (RFID) code of the ticket.

4. The system of claim 1, wherein:
the purchase request information includes limitations on use of the ticket; and
wherein the operations further comprise:
determining if any of the limitations on use of the ticket will be violated by the purchase.

5. The system of claim 1, wherein the determining, based on the electronic scan of the purchase request information, whether the purchasing power of the ticket is sufficient to purchase the product using the ticket comprises determining if an amount of the purchase will cause a purchasing money limit for the ticket to be exceeded.

6. The system of claim 1, wherein the operations further comprise selecting a funding source for the purchase that depends, at least in part, upon the product purchased.

7. A method comprising:
receiving, at a server through a network from a first user device via a first virtual ticket application, a first request from a user to add purchasing power to a ticket associated with a user account that was purchased for admittance to an event by the user;
creating, by the server, an ad hoc account that provides funds to the ticket and that is funded by the user account;
adding, by the server, the purchasing power requested in the first request to the ad hoc account from the user account that identifies the user of the user account without recording information regarding the user account with the ad hoc account;
providing, electronically by the server through the network for display on the first user device via the first virtual ticket application, the ticket having the purchasing power, wherein the ticket is configurable on a display of the first user device to display purchase request information that includes the purchasing power and that, in response to an electronic scan by a merchant device of a merchant causes a second request from the user to purchase a product to be communicated to the server;
determining, based on the electronic scan of the purchase request information, whether the purchasing power of the ticket is sufficient to purchase the product using the ticket;
authorizing, based on the electronic scan of the purchase request information, purchasing of the product using the ticket if the purchasing power is sufficient, wherein the electronically scanned purchase request information and the ad hoc account lack information that identifies the user of the ticket and the user account to the merchant and causes the merchant device to authorize purchasing of the product using the ticket without receiving any information that identifies the user and the user account; and
receiving a third request to transfer the ticket from the first virtual ticket application on the first user device to a second virtual ticket application on a second user device; and
electronically providing, through the network for display on the second user device via the second virtual ticket application, the ticket having the purchasing power.

8. The method of claim 7, wherein the purchase request information comprises information regarding features of the ticket that include an identification of the ticket, and wherein the ticket comprises a paper ticket.

9. The method of claim 7, wherein adding, by the server, the purchasing power requested in the first request to the ticket that is associated with the user account includes receiving a first amount of funds from the user and adding a second amount of funds to the ticket, wherein the second amount is greater than the first amount, and wherein the purchase request information includes information regarding at least one item selected from a list consisting of:
a bar code of the ticket;
a quick response (QR) code of the ticket; and
a radio frequency identification (RFID) code of the ticket.

10. The method of claim 7, wherein:
the purchase request information includes limitations on use of the ticket; and
wherein the operations further comprise:
determining if any of the limitations on use of the ticket will be violated by the purchase.

11. The method of claim 7, wherein the operations further comprise selecting funding source for the purchase that depends, at least in part, upon the product purchased.

12. A non-transitory machine-readable medium having stored thereon machine-readable instructions executable to cause a machine to perform operations comprising:
receiving, through a network from a first user device via a first virtual ticket application, a first request from a user to add purchasing power to a ticket associated with a user account that was purchased for admittance to an event by the user;
creating an ad hoc account that provides funds to the ticket and that is funded by the user account;
adding the purchasing power requested in the first request to the ad hoc account from the user account that identifies the user of the user account without recording information regarding the user account with the ad hoc account;
electronically providing, through the network for display on the first user device via the first virtual ticket application, the ticket having the purchasing power, wherein the ticket is configurable on a display of the first user device to display purchase request information that includes the purchasing power and that, in response to an electronic scan by a merchant device of a merchant, causes a second request from the user to purchase a product to be communicated to the server;
determining, based on the electronic scan of the purchase request information, whether the purchasing power of the ticket is sufficient to purchase the product using the ticket;
authorizing, based on the electronic scan of the purchase request information, purchasing of the product using the ticket if the purchasing power is sufficient, wherein the electronically scanned purchase request information and the ad hoc account lack information that identifies the user of the ticket and the user account to the merchant and causes the merchant device to authorize purchasing of the product using the ticket without receiving any information that identifies the user and the user account;
receiving a third request to transfer the ticket from the first virtual ticket application on the first user device to a second virtual ticket application on a second user device; and
electronically providing, through the network for display on the second user device via the second virtual ticket application, the ticket having the purchasing power.

13. The non-transitory machine-readable medium of claim 12, wherein the purchase request information comprises information regarding features of the ticket that include an identification of the ticket, and wherein the ticket comprises a paper ticket.

14. The non-transitory machine-readable medium of claim 12, wherein the adding the purchasing power requested in the first request to the ticket that is associated with the user account includes receiving a first amount of funds from the user and adding a second amount of funds to the ticket, wherein the second amount is greater than the first amount, and wherein the purchase request information includes information regarding at least one item selected from a list consisting of:
   a bar code of the ticket;
   a quick response (QR) code of the ticket; and
   a radio frequency identification (RFID) code of the ticket.

15. The non-transitory machine-readable medium of claim 12, wherein:
   the purchase request information includes limitations on use of the ticket; and
      wherein the operations further comprise:
         determining if any of the limitations on use of the ticket will be violated by the purchase.

16. The non-transitory machine-readable medium of claim 12, wherein the determining, based on the electronic scan of the purchase request information, whether the purchasing power of the ticket is sufficient to purchase the product using the ticket includes determining if an amount of the purchase will cause a purchasing money limit for the ticket to be exceeded.

17. The non-transitory machine-readable medium of claim 12, wherein the operations further comprise selecting a funding source for the purchase that depends, at least in part, upon the product purchased.

18. The system of claim 1, wherein the operations further comprise:
   removing the ticket from the first virtual ticket application on the first user device in response to the electronically providing, through the network for display on the second user device via the second virtual ticket application, the ticket having the purchasing power.

19. The method of claim 7, further comprising:
   removing the ticket from the first virtual ticket application on the first user device in response to the electronically providing, through the network for display on the second user device via the second virtual ticket application, the ticket having the purchasing power.

20. The non-transitory machine-readable medium of claim 12, wherein the operations further comprise:
   removing the ticket from the first virtual ticket application on the first user device in response to the electronically providing, through the network for display on the second user device via the second virtual ticket application, the ticket having the purchasing power.

* * * * *